April 2, 1957     W. BEEN     2,787,367
BELT CONVEYOR
Filed June 29, 1953
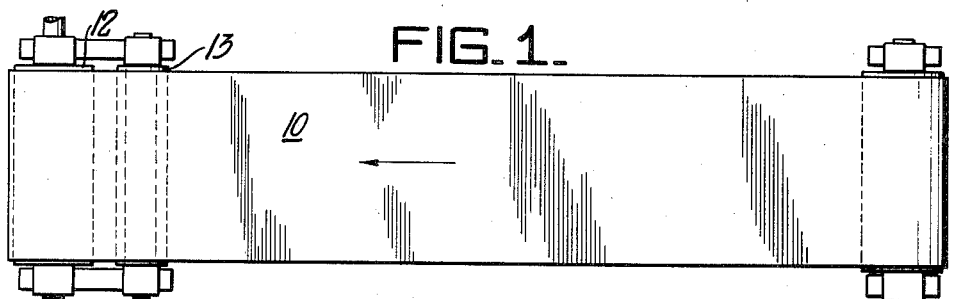
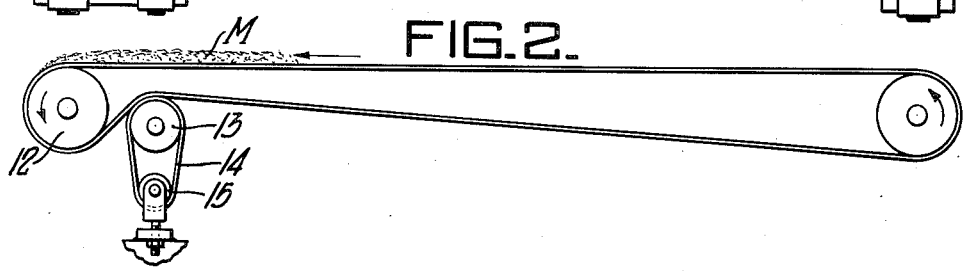
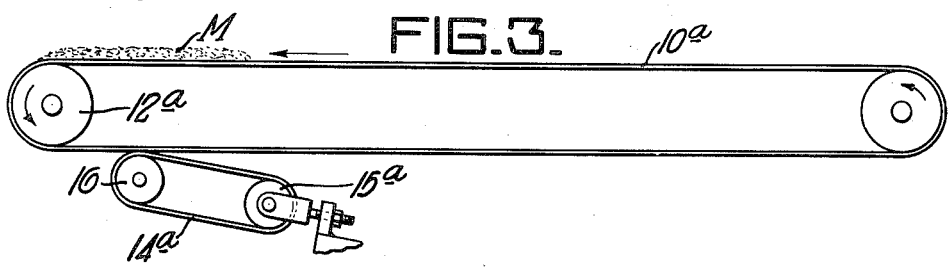
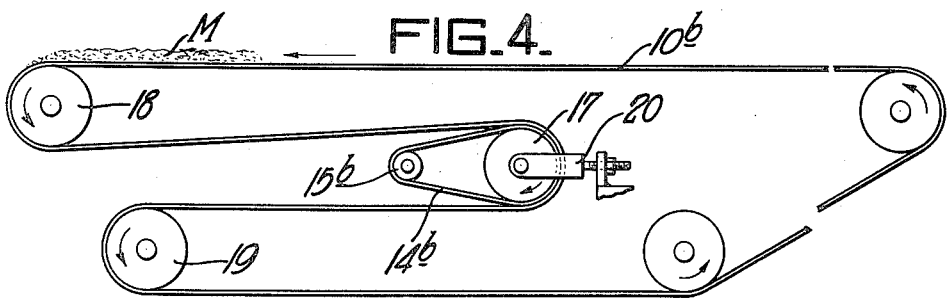
Inventor:
WALFRID BEEN,
by: Donald G. Dalton
his Attorney.

United States Patent Office 2,787,367
Patented Apr. 2, 1957

---

2,787,367
BELT CONVEYOR

Walfrid Been, Chisholm, Minn., assignor to United States Steel Corporation, a corporation of New Jersey Application June 29, 1953, Serial No. 364,661

3 Claims. (Cl. 198—230)

This invention relates to a protector for preventing loose material from accumulating on conveyor belt pulleys.

An object of the invention is to provide a simple protector which removes loose material clinging to a conveyor belt and thus prevents its accumulating on the pulleys.

A more specific object is to provide a tensioned protector belt which can run around any pulley whose peripheral surface is contacted by the carrying surface of a conveyor belt and removes loose clinging material before it accumulates on the pulley.

In accomplishing these and other objects of the invention I have provided improved details of structure, preferred forms of which are shown in the accompanying drawing, in which:

Figure 1 is a diagrammatic top plan view of a belt conveyor which has a snub pulley equipped with my protector;

Figure 2 is a diagrammatic side elevational view of the structure shown in Figure 1;

Figure 3 is a diagrammatic side elevational view of a belt conveyor which has a return idler equipped with my protector; and Figure 4 is a diagrammatic side elevational view of a belt conveyor which has an idler or bend pulley thus equipped.

Figures 1 and 2 show my protector applied to a snub pulley. These figures show schematically a flexible conveyor belt 10, a drive pulley 12 and a snub pulley 13. The upper or carrying flight of the belt is adapted to carry loose material M on its upper surface. This same surface of the belt runs over the snub pulley 13 on its lower or return flight. My protector comprises a short length endless flexible belt 14 and a tension pulley 15. The protector belt 14 has a minimum width at least as great as that of the conveyor belt 10. The protector belt runs over the snub pulley 13 between the peripheral surface of this pulley and the carrying surface of the conveyor belt 10 and over the tension pulley 15. The latter pulley can be mounted on the exposed side of the snub pulley at any convenient location, for example below the belt 10 on the conveyor frame, not shown. The protector belt picks up loose material that clings to the carrying surface of the conveyor belt on its return flight.

Such material then drops from the protector belt without contacting the surface of the snub pulley, and hence cannot accumulate on the latter.

Figure 3 shows my protector applied to a return idler 16, over which the carrying surface of a conveyor 10a travels on its return. The protector includes a belt 14a and tension pulley 15a which are mounted on the exposed side of the idler 16. The device operates in a similar fashion to the protector for the snub pulley 13, already described.

Figure 4 shows my protector applied to an idler or bend pulley 17. In this instance the conveyor belt 10b travels over a head pulley 18, around the idler or bend pulley 17 and a second such pulley 19. A tension device 20, shown only schematically, is connected to the pulley 17 for tensioning the belt, although optionally the tension device can be applied instead to the pulley 19. It is seen that only the pulley 17 is exposed to the carrying surface of the belt. My protector includes a belt 14b and a tension pulley 15b which are mounted on the exposed side of the pulley 17 and operate the same as in the embodiments already described.

From the foregoing description it is seen that my invention affords a simple protector for pulleys that are exposed to the carrying surface of the belt to prevent accumulation of loose material thereon. The device is readily applied to existing conveyor installations.

While certain preferred embodiments of my invention have been shown and described, it will be apparent that other adaptations and modifications may be made without departing from the scope of the following claims.

I claim:

1. In a conveyor which includes a belt and a drive pulley and an idler pulley over which said belt runs, said belt having a carrying flight and a return flight, said idler pulley furnishing support to said belt in its return flight at a location spaced from said drive pulley, the surface of the belt which carries material in the carrying flight facing the peripheral surface of said idler pulley, the combination with said idler pulley of a protector comprising an endless flexible belt extending therearound between the peripheral surface of the idler pulley and said first named belt for preventing loose material that clings to the first named belt in its return flight from accumulating on the idler pulley, and means spaced from said idler pulley over which said second named belt travels for tensioning it.

2. A combination as defined in claim 1 in which said second named belt is of a width at least as great as said first named belt.

3. A combination as defined in claim 2 in which said means includes another pulley around which said second named belt runs.

References Cited in the file of this patent

UNITED STATES PATENTS

| | | |
|---|---|---|
| 1,478,784 | Furbush | Dec. 25, 1923 |
| 2,243,538 | Salfisberg | May 27, 1941 |